(12) United States Patent
Schmidgall et al.

(10) Patent No.: US 10,919,704 B2
(45) Date of Patent: Feb. 16, 2021

(54) ROAD-PORTABLE CONVEYOR APPARATUS, SYSTEMS AND METHODS

(71) Applicant: Superior Industries, Inc., Morris, MN (US)

(72) Inventors: Alan Schmidgall, Morris, MN (US); Travis Thooft, Morris, MN (US); Lafe Grimm, Morris, MN (US); Zachary Ourada, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 25 days.

(21) Appl. No.: 16/264,640

(22) Filed: Jan. 31, 2019

(65) Prior Publication Data

US 2019/0233218 A1 Aug. 1, 2019

Related U.S. Application Data

(60) Provisional application No. 62/624,782, filed on Jan. 31, 2018.

(51) Int. Cl.
*B65G 41/00* (2006.01)

(52) U.S. Cl.
CPC .................. *B65G 41/001* (2013.01)

(58) Field of Classification Search
CPC ..... B65G 41/00; B65G 41/001; B65G 41/007
USPC ............... 198/300, 302, 304, 305, 313, 314
See application file for complete search history.

(56) References Cited

U.S. PATENT DOCUMENTS

| 4,135,614 | A |   | 1/1979  | Penterman et al. |
|-----------|---|---|---------|------------------|
| 4,245,732 | A | * | 1/1981  | Couperus ............... B65G 21/14 198/313 |
| 4,427,104 | A | * | 1/1984  | Reid, Jr. ............. B65G 41/002 198/306 |
| 4,624,357 | A | * | 11/1986 | Oury ...................... B65G 21/14 198/313 |
| 5,203,442 | A |   | 4/1993  | Oury et al. |
| 5,325,953 | A | * | 7/1994  | Doster .................. B65G 43/08 198/304 |
| 5,515,961 | A | * | 5/1996  | Murphy ............... B65G 41/008 198/302 |
| 5,833,043 | A | * | 11/1998 | Schmidgall .......... B65G 41/008 198/302 |
| 6,056,252 | A |   | 5/2000  | Johannsen |
| 6,186,311 | B1 |  | 2/2001  | Conner |
| 6,296,109 | B1 |  | 10/2001 | Nohl |
| 6,360,876 | B1 | * | 3/2002 | Nohl .................... B65G 41/008 198/302 |
| 6,591,971 | B1 | * | 7/2003 | Sheahan ............. A01F 25/2027 198/304 |
| 7,004,308 | B2 |   | 2/2006  | Parks et al. |

(Continued)

OTHER PUBLICATIONS

KPI-JCI Astec Companies, "Telescoping Radial Stacker—Model 33-36170 Super Stacker", South Dakota, Sep. 5, 2013, 2 pages.

(Continued)

*Primary Examiner* — Douglas A Hess
(74) *Attorney, Agent, or Firm* — Todd R. Fronek; Larkin Hoffman Daly & Lindgren Ltd.

(57) ABSTRACT

Road-portable conveyors are described. In some embodiments, the conveyor is supported on a trailer in a road transport configuration. In some embodiments, a support structure is attached to the conveyor and supported on a rolling support during road transport.

20 Claims, 9 Drawing Sheets

(56) References Cited

U.S. PATENT DOCUMENTS

| | | | | |
|---|---|---|---|---|
| 7,284,650 B2 * | 10/2007 | Hoffmann | ............ | B65G 41/008 |
| | | | | 198/303 |
| 7,284,947 B1 | 10/2007 | Felton | | |
| 7,308,968 B2 | 12/2007 | Denison | | |
| 7,424,943 B2 * | 9/2008 | Gausman | ............... | B65G 67/24 |
| | | | | 198/311 |
| 7,455,173 B1 * | 11/2008 | Fridman | ................ | B65G 21/14 |
| | | | | 198/302 |
| 7,618,231 B2 | 11/2009 | Felton | | |
| 8,584,826 B2 * | 11/2013 | Smith | .................. | B65G 41/008 |
| | | | | 198/302 |
| 8,739,956 B2 * | 6/2014 | Smith | .................. | B65G 41/008 |
| | | | | 180/6.48 |
| 8,875,864 B2 * | 11/2014 | Emerson | ................ | B65G 65/28 |
| | | | | 198/303 |
| 9,156,617 B2 | 10/2015 | Fehr et al. | | |
| 10,183,811 B1 * | 1/2019 | McCloskey | .......... | B65G 41/002 |
| 10,414,599 B2 * | 9/2019 | McCloskey | ............ | B65G 19/04 |
| 10,543,990 B2 * | 1/2020 | Brechon | ............. | B65G 41/002 |
| 10,556,752 B1 * | 2/2020 | McCloskey | .......... | B65G 41/002 |
| 10,589,939 B2 * | 3/2020 | Bratton | ................ | B65G 41/003 |

OTHER PUBLICATIONS

Telestack Limited, "Technical Specification—RS-P-Plate Radial Stacker", Northern Ireland, 2017, 12 pages.
Terex, "Terex MPS Conveyors", Products Brochure, 2017, 9 pages.
Douglas Manufacturing Co., Inc., "Traverse Pit Portable Radial Stacker", Brochure, 2014, 2 pages.
Superior Industries, "Slide-Pac Conveyors", Brochure, Dec. 2013, 2 pages.
Marco Conveyors, "HD Telescopics", Brochure, 2008, 2 pages.

\* cited by examiner

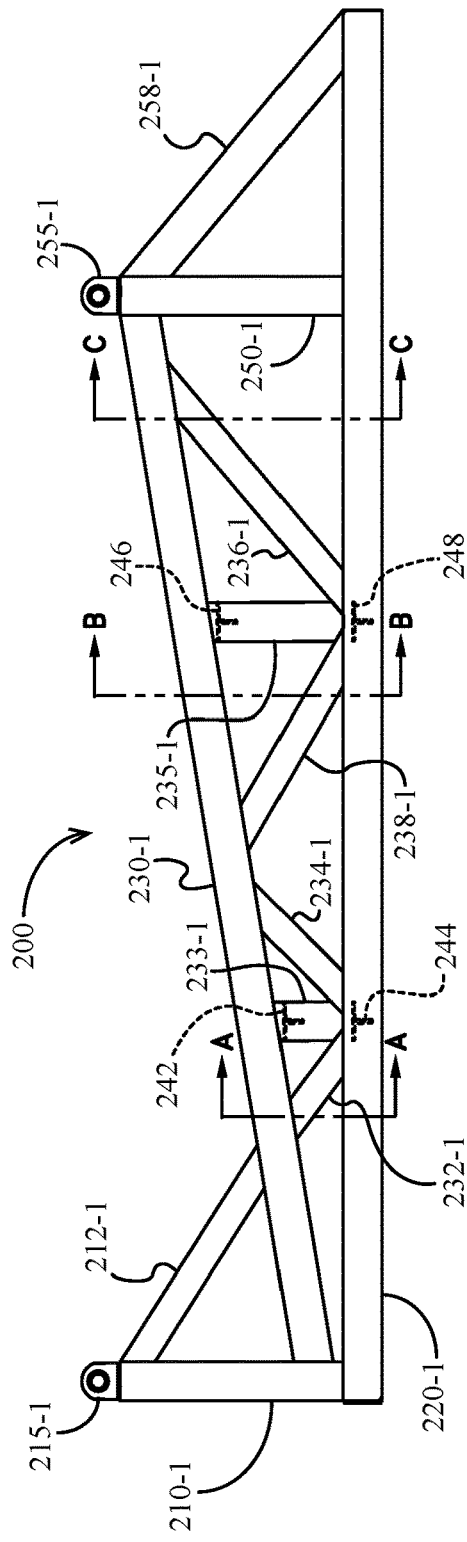
FIG. 5
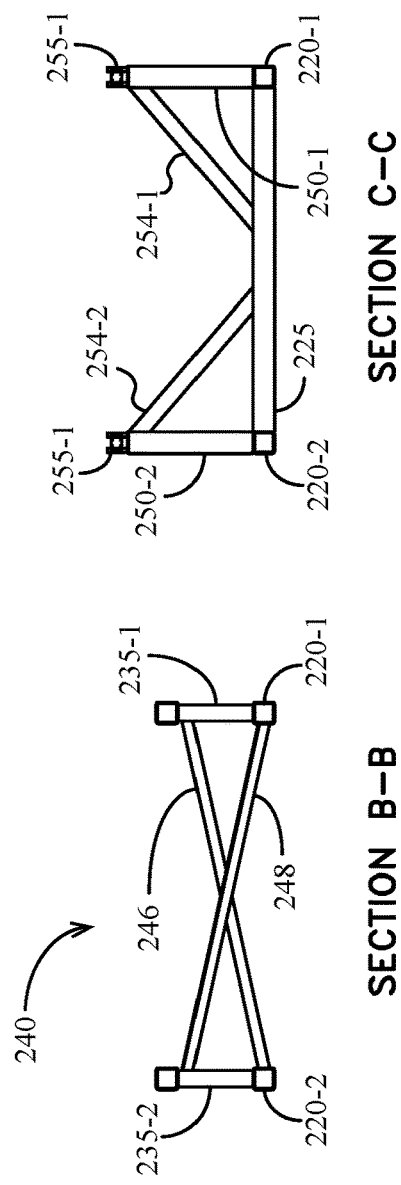
FIG. 8 SECTION C-C
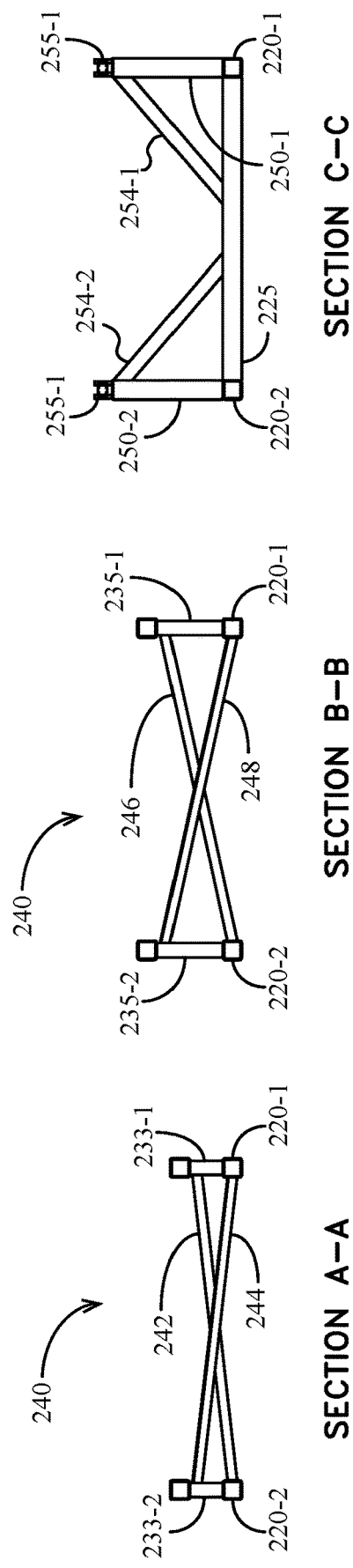
FIG. 7 SECTION B-B
FIG. 6 SECTION A-A

ROAD-PORTABLE CONVEYOR APPARATUS, SYSTEMS AND METHODS

BACKGROUND

Conveyors are used to convey material such as aggregate material. Some conveyors are transported over the road.

BRIEF DESCRIPTION OF THE DRAWINGS

FIG. 5 is a side elevation view of an embodiment of a conveyor support structure.

FIG. 6 is a partial sectional view along section A-A of FIG. 5.

FIG. 7 is a partial sectional view along section B-B of FIG. 5.

FIG. 8 is a partial sectional view along section C-C of FIG. 5.

DESCRIPTION

Figure 1:
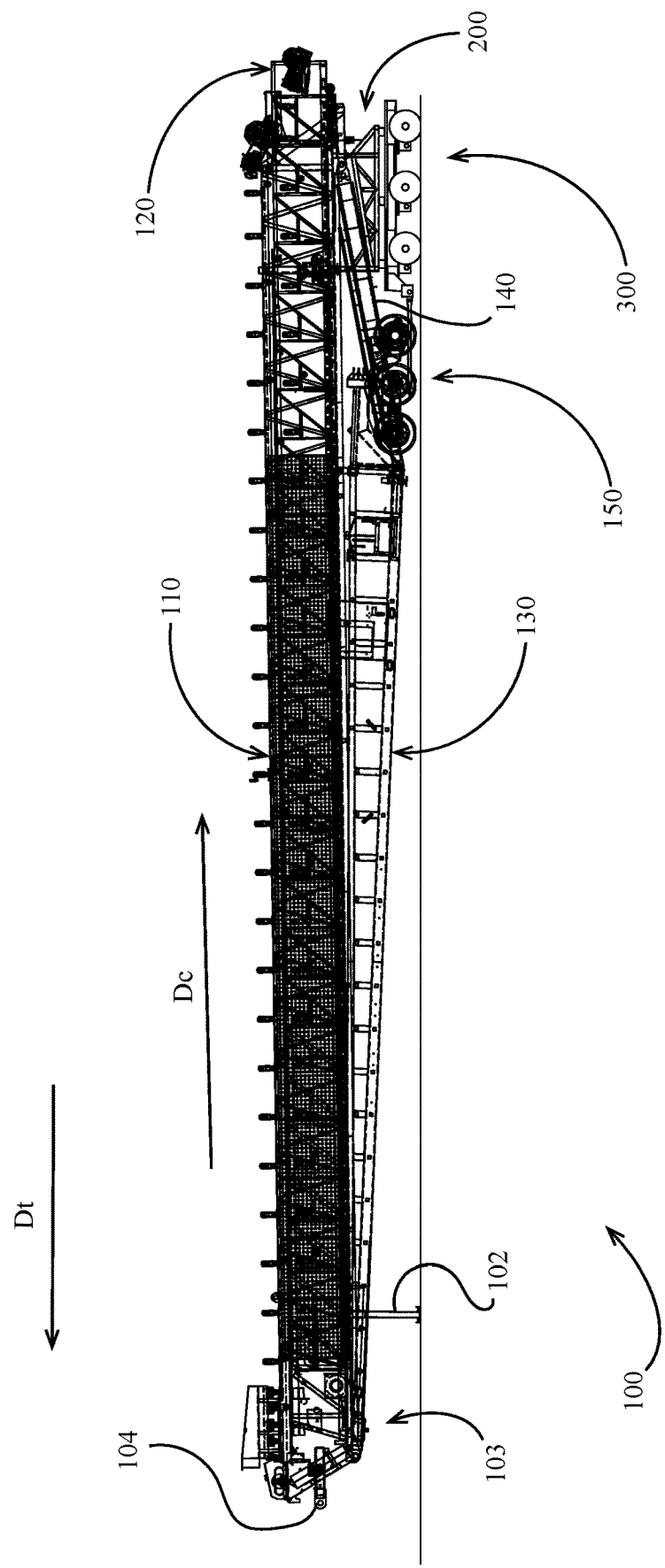
FIG. 1 is a side elevation view of an embodiment of a conveyor in a road transport configuration.

Referring to the drawings, wherein like reference numerals designate identical or corresponding parts throughout the several views, FIG. 1 illustrates a conveyor 100 in a transport configuration. The conveyor 100 optionally includes a first conveyor section 110 (e.g., truss) and a second conveyor section 120 (e.g., truss) that is extendable (e.g., rollingly, slidingly, etc.) relative to the first conveyor section in order to extend an effective conveying length of the conveyor. It should be appreciated that the conveyor 100 generally conveys material along a conveying direction Dc shown in FIG. 1, e.g., when the conveyor is reconfigured into an operating configuration. The conveyor 100 optionally comprises an undercarriage wheel assembly 150 (e.g., swing axle pivotable about a generally vertical axis). The wheel assembly 150 is optionally configured to at least partially support the conveyor. A first undercarriage section 130 optionally operably couples the wheel assembly 150 to the conveyor section 110. A second undercarriage section 140 (e.g., strut, telescoping strut, etc.) optionally operably couples the undercarriage section 130 and/or the wheel assembly 150 to the conveyor section 110; for example, in some embodiments, the undercarriage section 140 is optionally pivotally coupled to the undercarriage section 130 and/or the wheel assembly 150 at a first end thereof and pivotally coupled to the conveyor section 110 at a second end thereof.

A support structure 200 is optionally mounted (e.g., removably mounted in some embodiments) to the conveyor section 110 (e.g., near a head end thereof). The support structure 200 is optionally configured to at least partially support the conveyor 100 on a wheeled support 300 (e.g., jeep, dolly, trailer, axle, etc.) which is optionally a steerable wheeled support. The support structure 200 is optionally configured to be disposed underneath the undercarriage section 140 in a transport configuration without interfering with (e.g., contacting) the undercarriage section 140. The support structure 200 is optionally configured to at least partially support the conveyor 100 on the wheeled support 300 such that the wheel assembly 150 does not contact the ground (i.e., positioned above the ground) in a road transport configuration. In the road transport configuration, the conveyor 100 is at least partially supported by a towing vehicle (e.g., at a towing eye 104) for transport along a transport direction Dt. In the illustrated configuration of FIG. 1, the conveyor 100 is prepared for road transport and is temporarily supported on one or more legs 102 (e.g., jack stand, landing leg, etc.) or other structure near the tail end of the conveyor.

Figure 2:
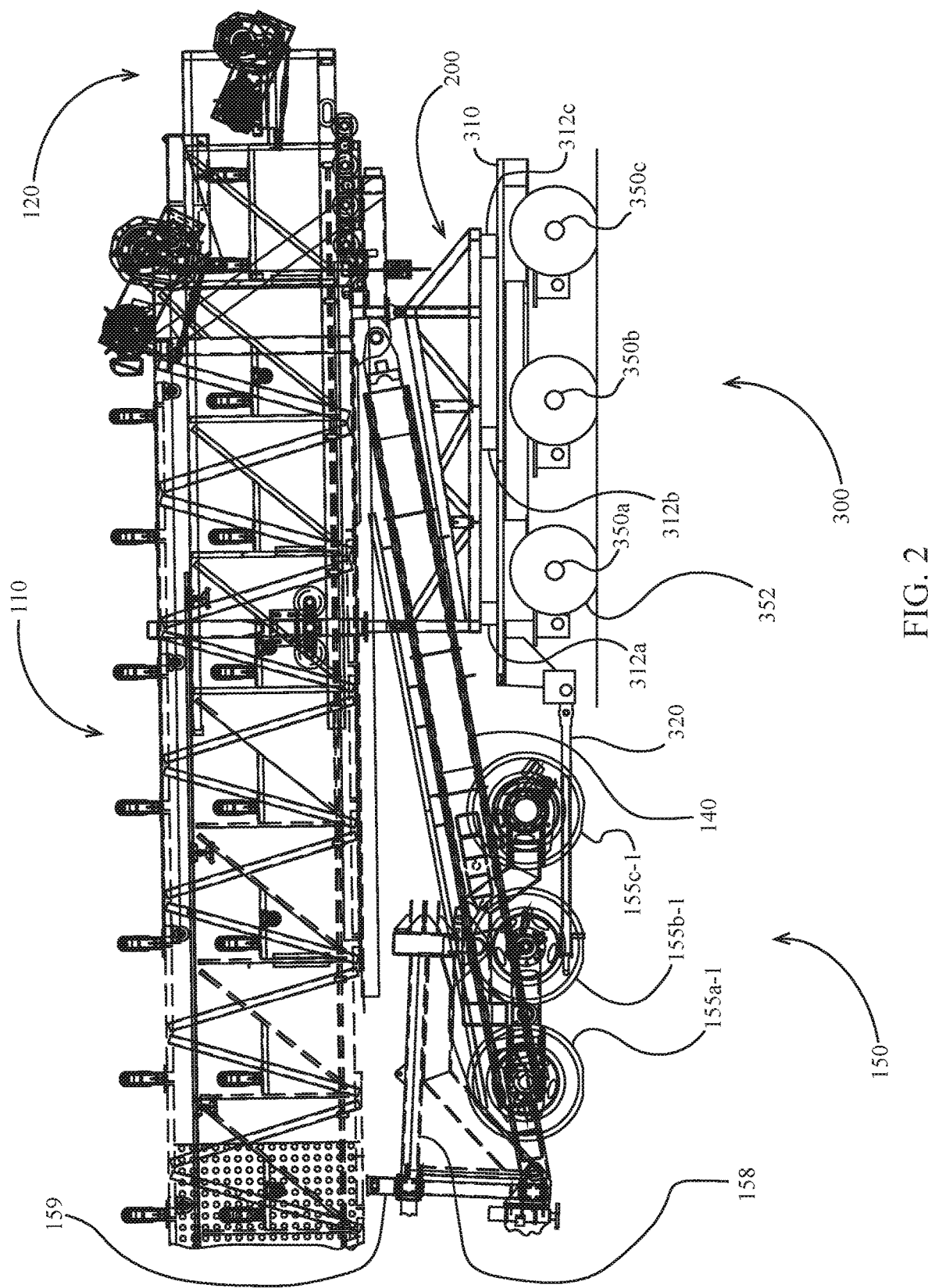
FIG. 2 is an expanded partial side elevation view of the conveyor of FIG. 1.
Figure 4:
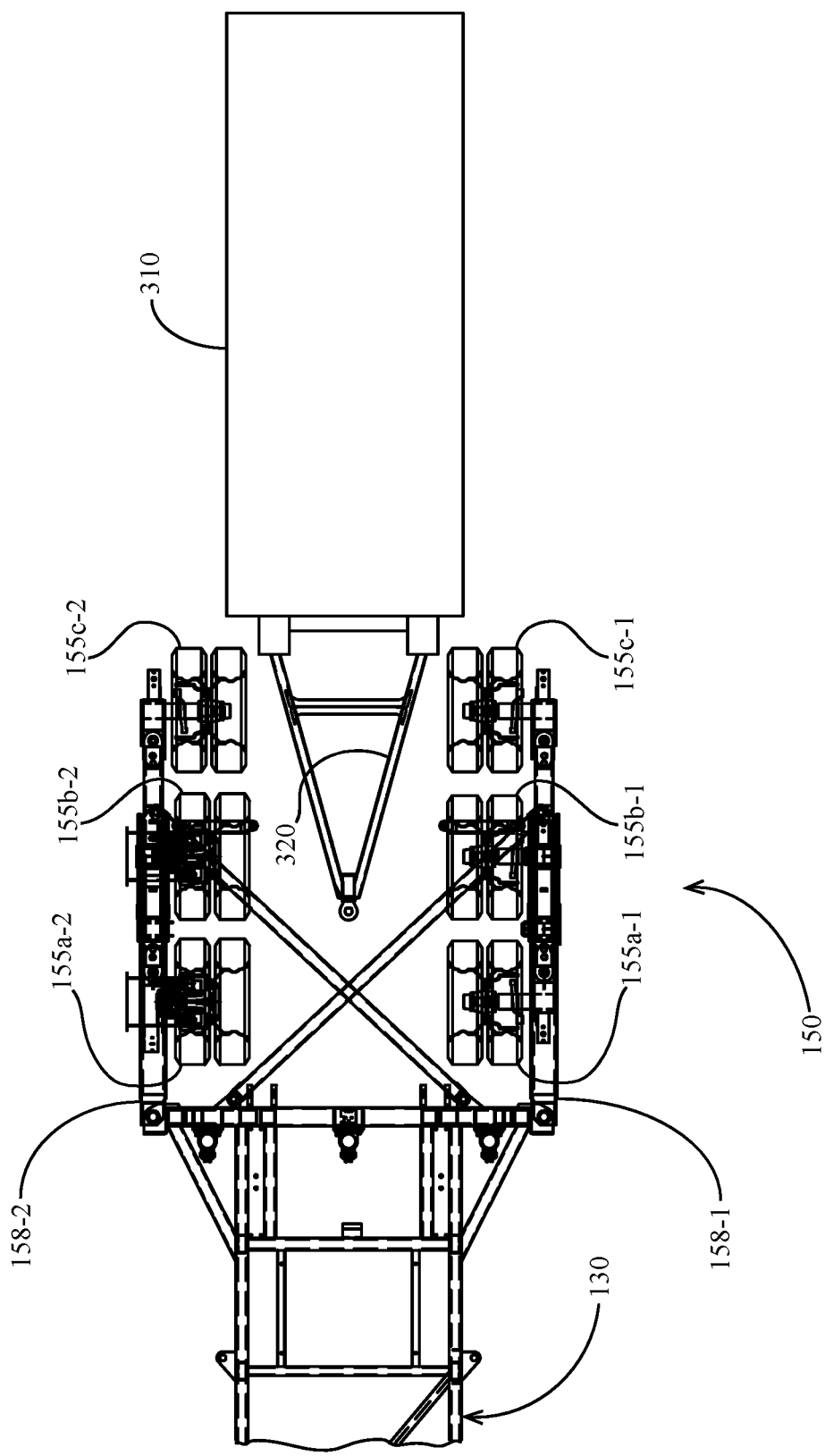
FIG. 4 is a plan view of a wheeled undercarriage support of the conveyor of FIG. 1 and a rolling support.
Figure 9:
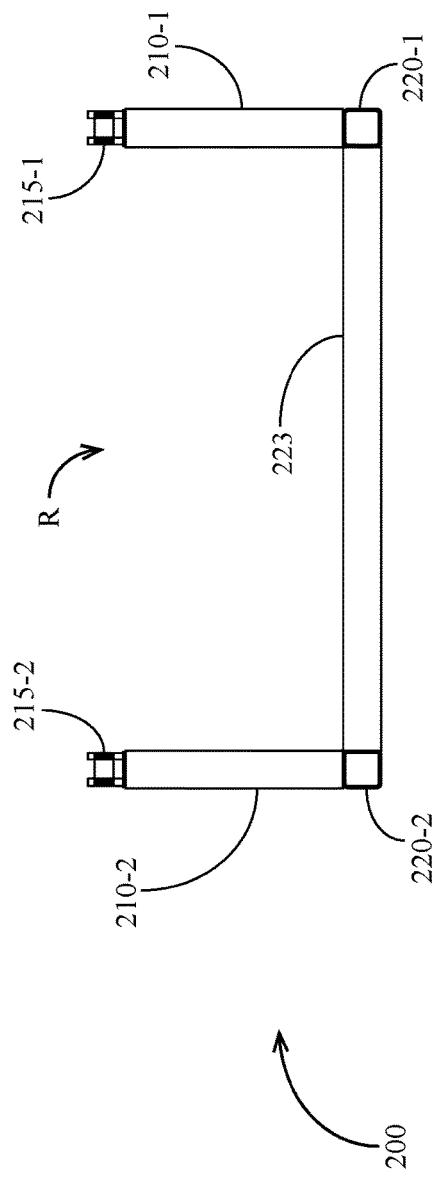
FIG. 9 is a partial front elevation view of the conveyor support structure of FIG. 5.
Figure 10:
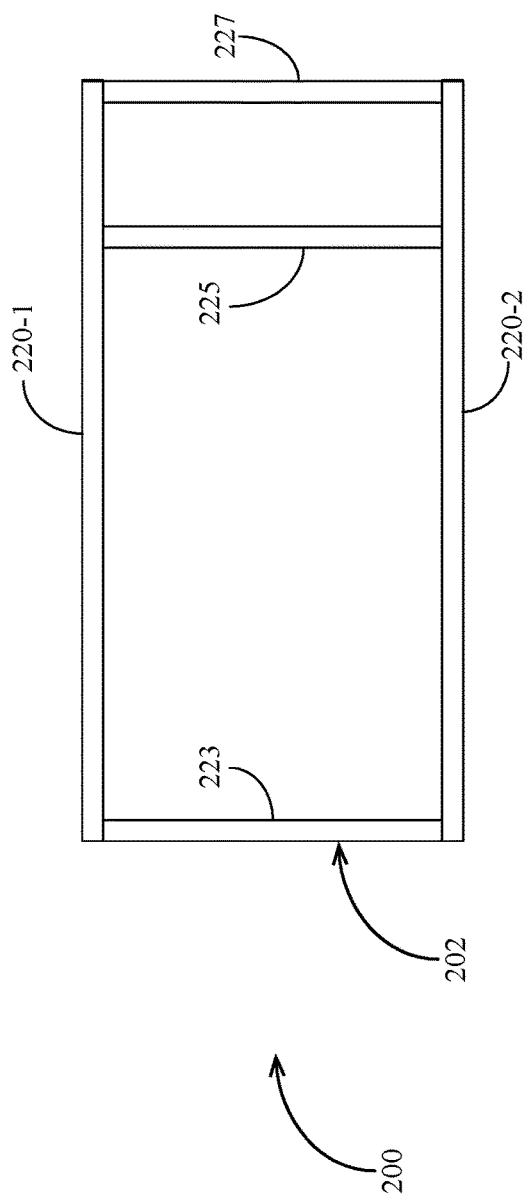
FIG. 10 is a bottom view of the conveyor support structure of FIG. 5.

Referring to FIGS. 2 and 4, the wheel assembly 150 optionally comprises a first plurality of wheels (e.g., wheels 155a-1, 155b-1, 155c-1) and a second plurality of wheels (e.g., wheels 155a-2, 155b-2, 155c-2), each plurality of wheels supported on a respective pivoting frame (e.g., frames 158-1, 158-2). In an operational configuration, the frames 158 are optionally oriented approximately normal to the conveying direction Dc in order to enable radial travel of the conveyor 100 about the tail pivot 103 of the conveyor. In a road transport configuration, the frames 158 are optionally oriented generally parallel to the travel direction Dt. In the road transport configuration, a towing frame 320 of the wheeled support 300 is optionally disposed laterally between two or more of the wheels 155 and/or laterally between the frames 158. A platform 310 of the wheeled support 300 is optionally disposed at least partially (in some embodiments completely) behind the wheels 155 along the travel direction Dt. Steerable axles 350 of the wheeled support 300 are optionally supported on wheels 352 such that the platform 310 can be steered upon turning of the conveyor (e.g., without skidding or with lessened skidding of the wheels 352). The support structure 200 is optionally supported on objects resting on the platform 310 (e.g., one or more cribbing elements 312), or in some implementations is supported directly on the platform 310.

In the road transport configuration, one or more pivoting frames 158 are removably mounted to the section 110 (e.g., by a pin inserted through a beam 159 and the section 110). Thus in some such embodiments, the wheel assembly 150 is supported above the ground in the road transport configuration and the conveyor 100 is optionally supported at least partially on the wheeled support 300 in the road transport configuration.

Figure 3:
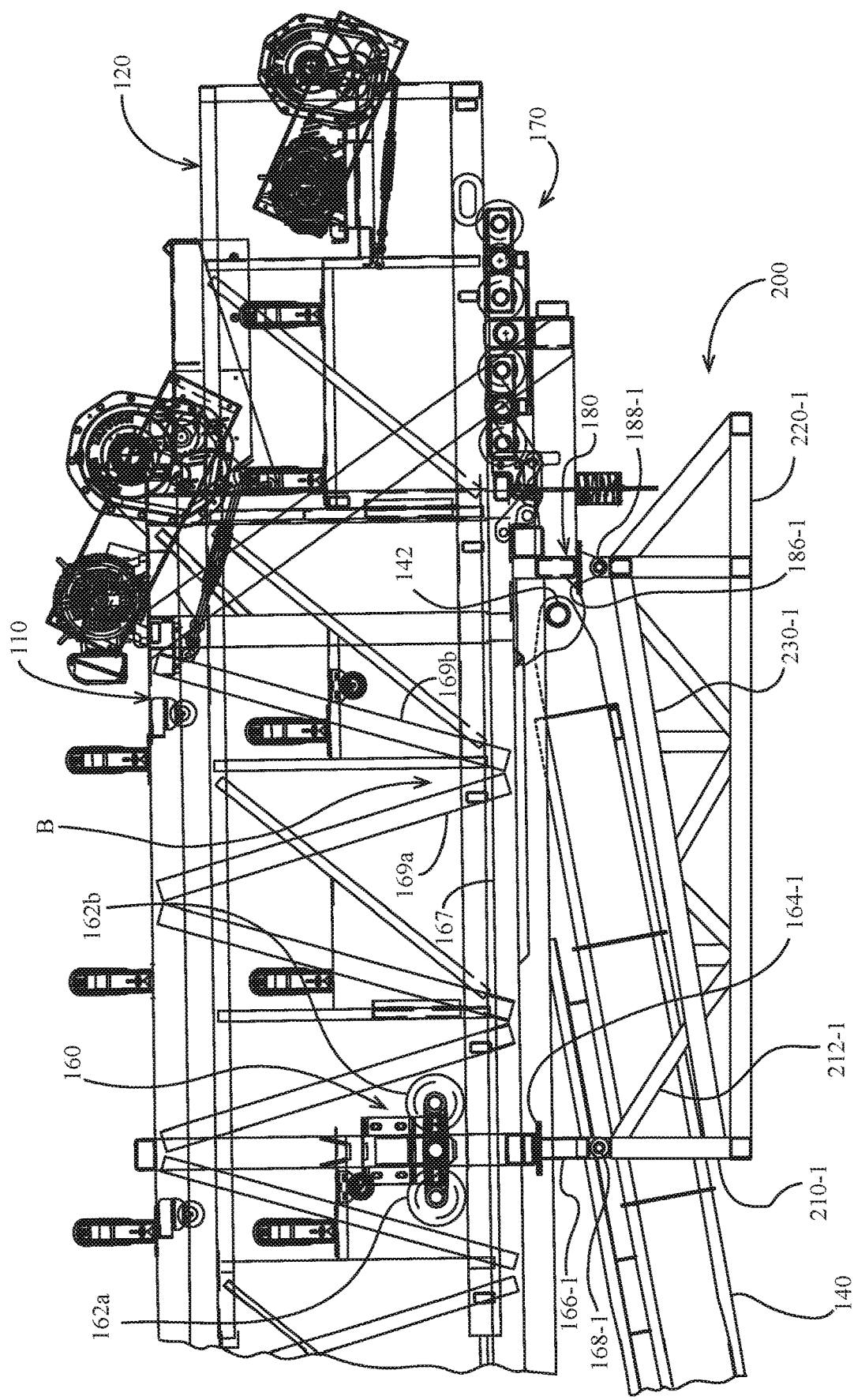
FIG. 3 is a further expanded partial side elevation view of the conveyor of FIG. 1.

Referring to FIG. 3, the support structure 200 may comprise any suitable material or structure and may be variously referred to as a skid, platform, support, truss, or by other terminology. In some embodiments, the support structure 200 is coupled (e.g., pinned) to the conveyor 100 at a first longitudinal position at or near (e.g., at least partially beneath) the longitudinal position of a roller 160 (e.g., secondary load roller) of the conveyor in the retracted road transport configuration of the conveyor 100. In some embodiments, the roller 160 is supported on (e.g., mounted to) the first conveyor section 110 and optionally comprises one or more wheels 162 which may be rollingly and/or slidingly engaged with the second conveyor section 120. In some alternative embodiments (e.g., those not including a load roller) the support structure 200 may be coupled to the conveyor 100 at a longitudinal position at or near a reinforced portion B of a lower rail 167 of the first conveyor section 110, e.g., a portion at or near which two side supports 169 (e.g., struts, lattice members) of the first conveyor section 110 converge. In other embodiments, the support structure 200 may be coupled to the conveyor at another relatively well-supported location on the first conveyor section 110. In some embodiments, the support structure 200 is coupled to the conveyor at a second longitudinal position at, near, and/or at least partially rearward (with reference to travel direction Dt) of a pivot connection 142 at which the undercarriage section 140 is pivotally coupled to the first conveyor section 110. In some embodiments, the support structure 200 is coupled to the conveyor at a second longitudinal position at, near, and/or at least partially forward (with reference to travel direction Dt) of a load roller 170.

Referring to FIGS. 3 and 5-10, the support structure 200 optionally comprises connections 215-1, 215-2 which are optionally coupled (e.g., pinned) to vertically-extending beams 166-1, 166-2, respectively. The beams 166-1, 166-2 are optionally coupled (e.g., removably coupled) to mounting plates 164-1, 164-2, respectively. The plates 164 are optionally mounted to the conveyor (e.g., to the conveyor section 110, to support structure of the secondary load roller 160, etc.).

Figure 12:
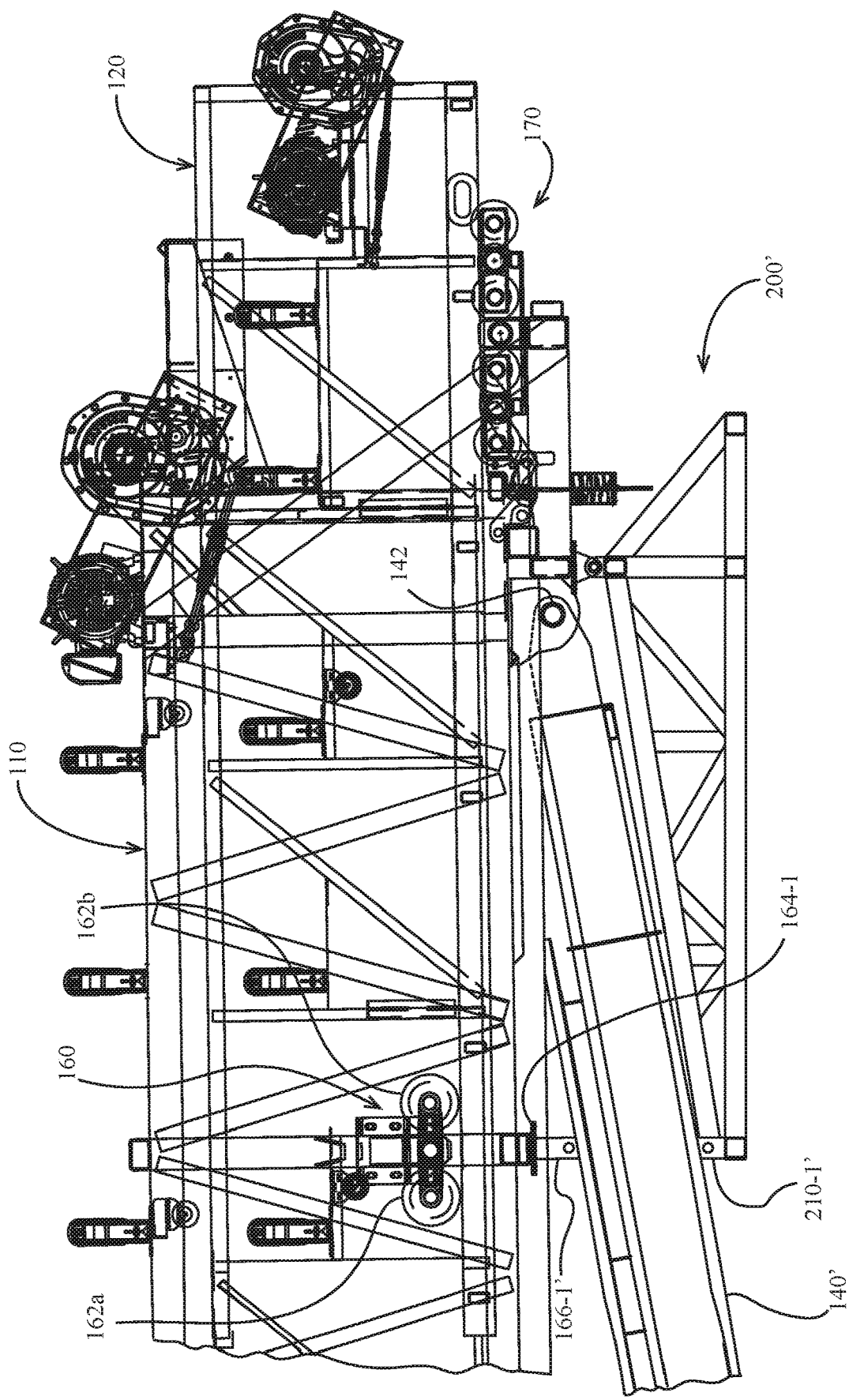
FIG. 12 is a partial side elevation view of another embodiment of a conveyor.

Referring to the alternative embodiment illustrated in FIG. 12, in some embodiments modified supports 210' and 166' (or other suitable support structure) are respectively removably mounted (e.g., by removable pins or other apparatus) to a modified undercarriage section 140'. In some embodiments, the supports 210' and 166' are not disposed entirely outboard of the undercarriage section 140'. In some embodiments, an additional connection (e.g., the beam 159 illustrated as to some other embodiments described herein herein) to the first conveyor section 110 is optionally omitted.

Returning to FIGS. 3 and 5-10, the support structure 200 optionally comprises connections 255-1, 255-2 which are optionally coupled (e.g., pinned) to coupling plates 188-1, 188-2, respectively. The coupling plates 188-1, 188-2 are optionally coupled (e.g., removably coupled) to mounting plates 186-1, 186-2, respectively. The plates 186 are optionally mounted to a beam 180 or other support structure of the conveyor (e.g., conveyor section 110).

The connections 215-1, 215-2 are optionally supported by generally vertical supports 210-1, 210-2, respectively. The supports 210 are optionally supported on (e.g., mounted to) a base 202 which optionally comprises lateral supports 223, 225, 227 (e.g., beams, angles, plates, etc.) joining longitudinally extending and laterally spaced-apart supports 223 (e.g., beams, angles, plates, etc.).

The connections 255-1, 255-2 are optionally supported by generally vertical supports 250-1, 250-2, respectively. The supports 250 are optionally supported on (e.g., mounted to) the base 202.

Angled supports 230 (e.g., beams, angles, plates, etc.) optionally join the supports 250 to the supports 210. Additional supports 212, 242, 234, 236, 238, 258 (e.g., beams, angles, plates, etc.) optionally additionally strengthen the support structure 200 (e.g., against deformation in a vertical longitudinal plane. Angled supports 254 optionally join the supports 250 to the base 202 (e.g., to support 225).

Angled supports 242, 244 (e.g., angles, beams, plates, etc.) optionally join vertical supports 233 on a first lateral side of the support structure to a longitudinal support 220 on a second lateral side of the support structure. Angled supports 246, 248 (e.g., angles, beams, plates, etc.) optionally join vertical supports 235 on a first lateral side of the support structure to a longitudinal support 220 on a second lateral side of the support structure.

In the road transport position, the undercarriage section 140 extends through a region R (e.g., area, volume, etc.) disposed between the supports 210. The angled supports 242, 244, 246, 268 are optionally positioned such that the undercarriage section 140 is disposed above and/or does not interfere with the angled supports.

A method of supporting a conveyor on a wheeled support is illustrated progressively from FIG. 11A to FIG. 11D. Some embodiments of the method may be carried out using the conveyor 100 and wheeled support 300 described above; some embodiments of the method may be carried out using other conveyor or wheeled support embodiments.

Figure 11A:
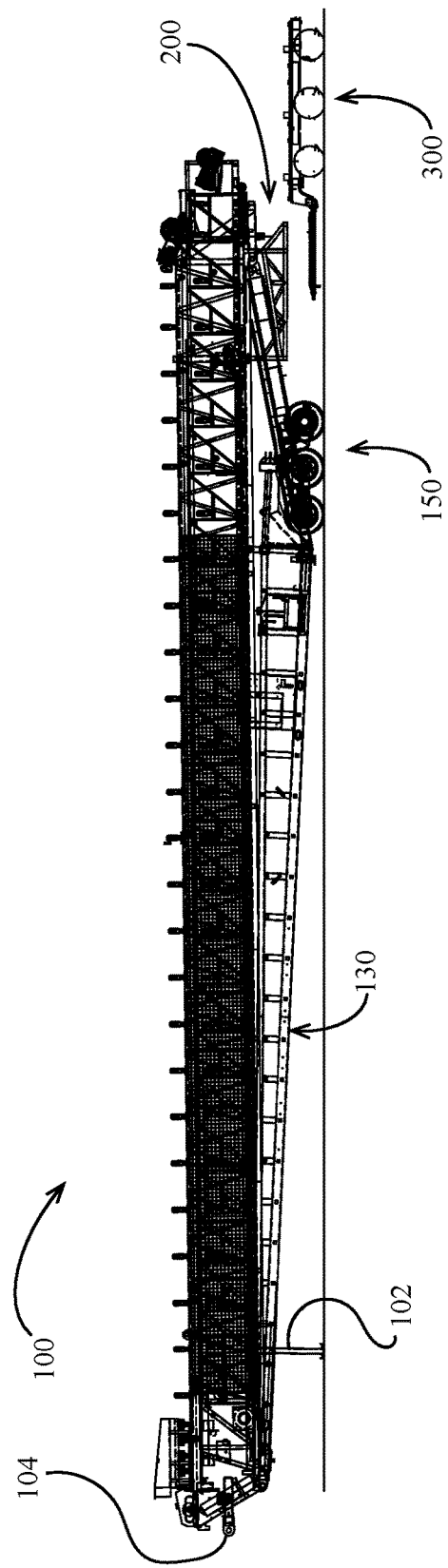
FIG. 11A is a side elevation view of a conveyor separate from a rolling support.

Referring to FIG. 11A, the support structure 200 (e.g., shipping skid, etc.) is optionally attached to the conveyor 100 (e.g., to the conveyor section 110). The wheeled support 300 (e.g., dolly, jeep, etc.) is optionally positioned in alignment (e.g., along travel direction Dt) with the conveyor 100. Cribbing (e.g., timbers or other elements) are optionally placed on a platform of the wheeled support 300. The conveyor 100 is optionally initially supported on a leg or legs 102 and the wheel assembly 150.

Figure 11B:
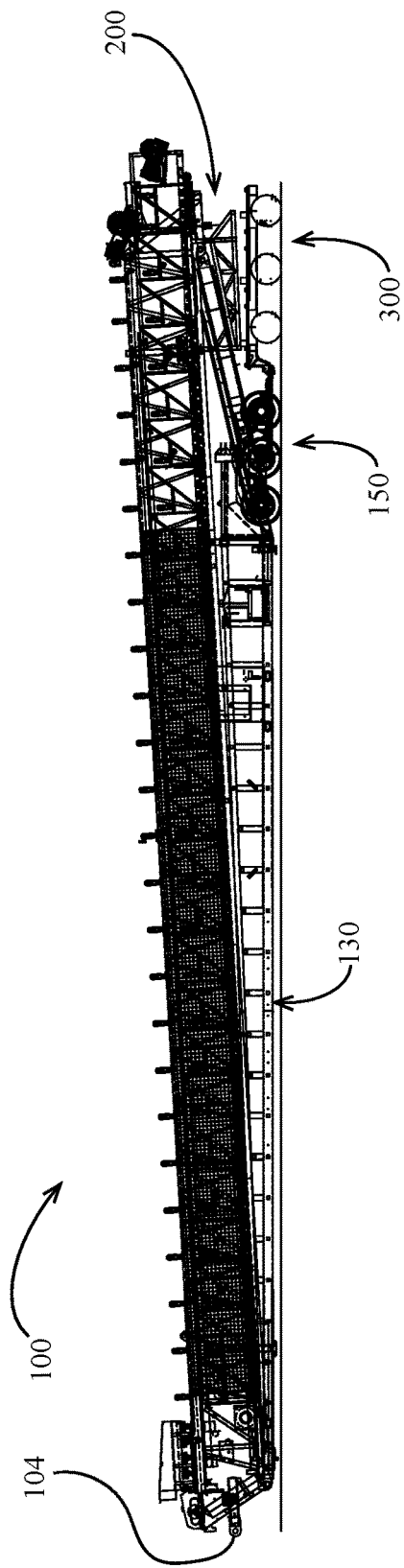
FIG. 11B is a side elevation view of a conveyor with a rolling support disposed beneath a conveyor support structure of a conveyor.

Referring to FIG. 11B, the tail end of the conveyor 100 is optionally temporarily supported at the towing eye 104 (or counterweight hooks or other attachment structure) and lifted such that the legs 102 may be adjusted (e.g., folded up or removed). The tail end of the conveyor 100 is then optionally lowered (e.g., raising the head end of the conveyor) in order to create a vertical clearance between a lower portion (e.g., base) of the support structure 200 and a height of a platform of the wheeled support 300 (e.g., a platform thereof) and/or any cribbing elements on the wheeled support.

Figure 11C:
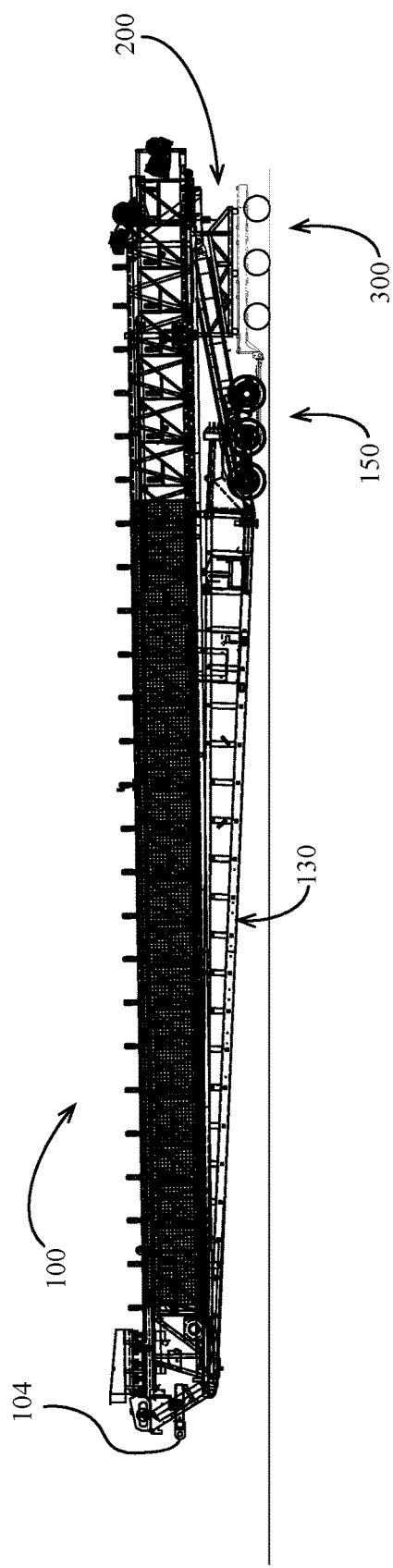
FIG. 11C is a side elevation view of a conveyor with a conveyor support structure supported at least partially on a rolling support.

Referring to FIG. 11C, the tail end of the conveyor 100 is optionally lifted until the support structure 200 (e.g., a base thereof) contacts the wheeled support 300 (e.g., a platform thereof) and/or any cribbing elements on the wheeled support. The tail end of the conveyor 100 is optionally lifted until the head end of the conveyor is supported on the wheeled support 300 and/or until there is a vertical clearance between the ground surface and the wheels of the wheel assembly 150.

Figure 11D:
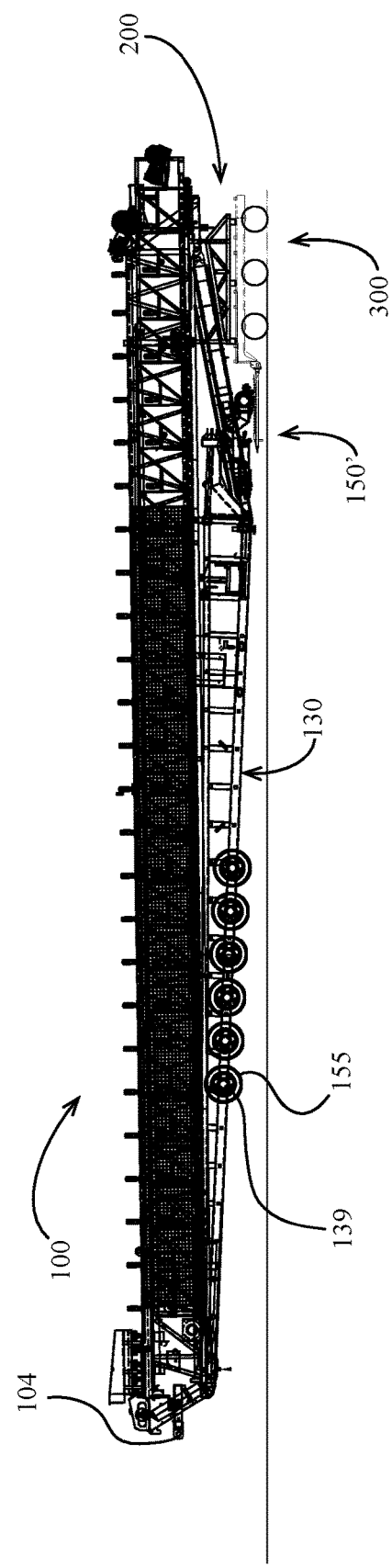
FIG. 11D is a side elevation view of a conveyor with a conveyor supported at least partially on a rolling support with transport wheels of the conveyor removed and supported for transport on an undercarriage frame of the conveyor.

Referring to FIG. 11D, one or more wheels 155 (or tires thereof) of the wheel assembly 150 are optionally removed. The wheels and/or tires are optionally relocated and supported elsewhere on the conveyor, e.g., on supports 139 which are optionally provided on the undercarriage section 130. The conveyor 100 is then towed (e.g., transported on a road) and supported on the wheeled support 300; turning of the conveyor (e.g., to the right or left of general travel direction Dt) optionally results in "steering" or turning of the wheels on the wheeled support 300.

One or more conveyor embodiments described herein may have common features and/or functionality of the conveyor embodiments disclosed in U.S. Pat. No. 7,618, 231, hereby incorporated by reference herein in its entirety.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor having an operational configuration and a road transport configuration, the conveyor comprising:
   a wheel assembly;
   a first conveyor section, the first conveyor section supported at least partially on said wheel assembly in the operational configuration, the wheel assembly supported at least partially on said first conveyor section in the road transport configuration;
   a wheeled support at least partially supporting said first conveyor section in the road transport configuration;
   a support structure configured to be supported on said wheeled support, said support structure being removably mounted to said first conveyor section;
   a first undercarriage section, said first undercarriage section being mounted to a rearward end of said first conveyor section, said wheel assembly being pivotally coupled to a forward section of said first undercarriage section for pivoting about a generally vertical axis; and
   a second undercarriage section, said second undercarriage section comprising a telescoping strut, said second undercarriage section being pivotally coupled at a rearward end thereof to said first undercarriage section for pivoting about a generally horizontal axis.

2. The conveyor of claim 1, wherein said wheeled support is steerable.

3. The conveyor of claim 1, wherein said wheeled support comprises a plurality of steerable axles.

4. The conveyor of claim 1, wherein said first undercarriage section is at least partially supported by the first conveyor section in the road transport configuration.

5. The conveyor of claim 1, wherein said second undercarriage section extends at least partially through said support structure.

6. The conveyor of claim 1, wherein said support structure is removably mounted to said second undercarriage section, and wherein said second undercarriage section is removably mounted to said first conveyor section.

7. The conveyor of claim 1, wherein said support structure comprises a truss having a plurality of angled support members.

8. The conveyor of claim 1, further comprising:
   a second conveyor section slidingly engaged with said first conveyor section; and
   a load roller mounted to said first conveyor section and rollingly supporting said second conveyor section.

9. The conveyor of claim 8, wherein said support structure is mounted to a portion of said first conveyor section adjacent to said load roller.

10. The conveyor of claim 1, wherein said first conveyor section includes a lower rail and a plurality of angled supports, wherein said support structure is mounted to a portion of said lower rail adjacent to at least two of said plurality of angled supports.

11. The conveyor of claim 1, further comprising a tail pivot supporting said first conveyor section.

12. The conveyor of claim 11, further comprising:
   a first undercarriage section, said first undercarriage section being mounted to a rearward end of said first conveyor section, said wheel assembly being pivotally coupled to a forward section of said first undercarriage section for pivoting about a generally vertical axis; and
   a second undercarriage section, said second undercarriage section comprising a telescoping strut, said second undercarriage section being pivotally coupled at a rearward end thereof to said first undercarriage section for pivoting about a generally horizontal axis, said second undercarriage section.

13. The conveyor of claim 1, wherein said wheel assembly comprises a swing axle.

14. A method of reconfiguring a conveyor between a first configuration in which the conveyor is at least partially supported on a wheel assembly by an intermediate support structure and a second configuration in which the conveyor is at least partially supported on a steerable wheeled support, the method comprising:
   attaching the support structure to the conveyor;
   positioning the wheeled support in alignment with the conveyor;
   lifting a tail end of the conveyor;
   creating a vertical clearance between a lower portion of the support structure and the wheeled support; and
   supporting the conveyor at least partially on the wheeled support.

15. The method of claim 14, further comprising:
   supporting the wheel assembly on the conveyor such that the wheel assembly is supported off the ground when the conveyor is supported at least partially on the wheeled support.

16. The method of claim 14, further comprising:
   towing the conveyor by a tail end thereof for road transport.

17. The method of claim 16, further comprising:
   turning the conveyor during road transport such that one or more wheels of the wheeled support is steered.

18. The method of claim 14, wherein said wheeled support comprises a plurality of steerable axles.

19. The method of claim 14, further comprising:
   pivoting said wheeled support about a vertical axis.

20. The method of claim 14, wherein said step of attaching the support structure to the conveyor comprises attaching the support structure to a truss of the conveyor.

* * * * *